(12) United States Patent
Alousque et al.

(10) Patent No.: US 12,577,173 B2
(45) Date of Patent: Mar. 17, 2026

(54) METHOD FOR MANUFACTURING A PART MADE OF CARBON/CARBON COMPOSITE MATERIAL WITH IMPROVED MECHANICAL PROPERTIES

(71) Applicant: Safran Landing Systems, Velizy-Villacoublay (FR)

(72) Inventors: Fanny Alousque, Moissy-Cramayel (FR); Amélie Rethore, Moissy-Cramayel (FR); Patrice Brender, Moissy-Cramayel (FR)

(73) Assignee: Safran Landing Systems, Velizy-Villacoublay (FR)

( * ) Notice: Subject to any disclaimer, the term of this patent is extended or adjusted under 35 U.S.C. 154(b) by 153 days.

(21) Appl. No.: 18/274,789

(22) PCT Filed: Jan. 27, 2022

(86) PCT No.: PCT/FR2022/050155
§ 371 (c)(1),
(2) Date: Jul. 28, 2023

(87) PCT Pub. No.: WO2022/162320
PCT Pub. Date: Aug. 4, 2022

(65) Prior Publication Data
US 2024/0083822 A1 Mar. 14, 2024

(30) Foreign Application Priority Data
Jan. 29, 2021 (FR) ...................................... 2100842

(51) Int. Cl.
*C04B 35/83* (2006.01)
*C04B 35/624* (2006.01)
(Continued)

(52) U.S. Cl.
CPC ............ *C04B 35/83* (2013.01); *C04B 35/624* (2013.01); *C04B 35/62655* (2013.01);
(Continued)

(58) Field of Classification Search
CPC . C04B 35/83; C04B 35/624; C04B 35/62855; C04B 35/62873; C04B 2235/3244
See application file for complete search history.

(56) References Cited

U.S. PATENT DOCUMENTS 5,290,491 A * 3/1994 Heraud ............. C04B 35/62844
264/29.4
10,017,424 B2 * 7/2018 Landwehr ............. C04B 35/571
(Continued)

FOREIGN PATENT DOCUMENTS

FR 2967170 A1 5/2012
WO 2019175501 A1 9/2019

OTHER PUBLICATIONS

International Patent Application No. PCT/FR2022/050155, International Search Report (with translation) and Written Opinion, dated Apr. 22, 2022.

*Primary Examiner* — Nahida Sultana
(74) *Attorney, Agent, or Firm* — Kilpatrick Townsend & Stockton LLP

(57) ABSTRACT

Method for manufacturing a part made from carbon/carbon composite material, comprising:
the formation of a carbonaceous preform,
partial densification of the preform by a pyrocarbon matrix thus forming a partially densified blank,
the impregnation of the partially densified blank with an impregnation solution including ceramic particles or ceramic precursors, and
the drying of the impregnated blank.
Furthermore, the viscosity of the dispersion or impregnation solution is controlled in order to control the homogeneity of
(Continued)

| | |
|---|---|
| FORMATION D'UNE PREFORME CARBONEE | ~100 |
| DENSIFICATION PARTIELLE DE LA PREFORME CARBONEE PAR UNE MATRICE PYROCARBONE | ~200 |
| IMPREGNATION PAR UNE SOLUTION DE TYPE SOL/GEL OU DISPERSION COLLOIDALE DE VISCOSITE CONTROLEE | ~300 |
| SECHAGE DE L'EBAUCHE IMPREGNEE | ~400 |
| TRAITEMENT THERMIQUE | ~500 |
| DENSIFICATION FINALE | ~600 | the distribution of the ceramic particles in the part of the impregnated composite material during drying.

11 Claims, 2 Drawing Sheets

(51) Int. Cl.
  *C04B 35/626* (2006.01)
  *C04B 35/628* (2006.01)
  *C04B 35/634* (2006.01)
(52) U.S. Cl.
  CPC .. *C04B 35/62855* (2013.01); *C04B 35/62873* (2013.01); *C04B 35/62892* (2013.01); *C04B 35/62894* (2013.01); *C04B 35/63488* (2013.01); *C04B 2235/3244* (2013.01); *C04B 2235/422* (2013.01); *C04B 2235/5248* (2013.01); *C04B 2235/5252* (2013.01); *C04B 2235/5436* (2013.01); *C04B 2235/616* (2013.01)

(56) References Cited

U.S. PATENT DOCUMENTS

| | | | | |
|---|---|---|---|---|
| 12,110,256 B2 * | 10/2024 | Bouillon | ............... | C04B 35/571 |
| 2004/0002770 A1 * | 1/2004 | King | ........................ | A61L 27/54 |
| | | | | 264/273 |
| 2013/0337180 A1 | 12/2013 | Jacquemard et al. | | |
| 2014/0051771 A1 * | 2/2014 | Hufen | ....................... | A61N 1/05 |
| | | | | 525/227 |
| 2015/0166410 A1 * | 6/2015 | Waghray | ............... | F16D 69/023 |
| | | | | 264/29.1 |
| 2017/0175833 A1 | 6/2017 | Le Costaouec et al. | | |
| 2022/0242796 A1 * | 8/2022 | Dhawan | .................. | C04B 35/80 |
| 2023/0138566 A1 * | 5/2023 | Hadigheh | ............... | B29C 70/54 |
| | | | | 264/484 |
| 2023/0399520 A1 * | 12/2023 | Alvarado | ........... | C09D 133/062 |

* cited by examiner

METHOD FOR MANUFACTURING A PART MADE OF CARBON/CARBON COMPOSITE MATERIAL WITH IMPROVED MECHANICAL PROPERTIES

CROSS REFERENCE TO RELATED APPLICATION

This application is related to and claims priority benefits from French Patent Application No. 2100842 ("the '842 application"), filed on Jan. 29, 2021. The '842 application is hereby incorporated in its entirety by this reference.

TECHNICAL FIELD

The present invention relates, in general terms, to carbon/carbon composite materials.

More precisely, the invention relates to manufacturing parts made from carbon/carbon composite materials and, more particularly, to improving the mechanical properties thereof in the face of wear and rubbing, in order to improve the service life thereof and the recycling/renovation thereof.

Such composite materials are known for use thereof in producing brake discs, in particular for aircraft. Because of their function in the aeronautical field, friction parts require high resistance to rubbing and wear. In addition, friction parts have a complex life cycle often consisting of several lives that require the manufacture of materials having characteristics that are homogeneous over time.

Conventionally, the material comprises a carbon matrix incorporated in a reinforcement formed by a fibrous carbon preform.

PRIOR ART

In order to improve the mechanical performances of carbon/carbon composite materials in the face of wear, introducing ceramic particles is known from the prior art, as disclosed, for example, in the document FR 2 967 170.

Typically, the manufacture consists of the densification of a carbon fibre preform by a pyrocarbon matrix, in order to obtain a blank.

The densification, implemented partially, is followed by the impregnation of the blank with an impregnation solution, generally of the sol-gel type, including ceramic precursors, or a colloidal dispersion, including ceramic fillers intended to reinforce the structure.

However, it was found that the distribution of the ceramic particles in the material was not homogeneous. During the phase of drying the impregnation solution, the particles are entrained towards the periphery of the part, and consequently forming a concentration gradient. A high concentration of ceramic particles is found at the edges of the material, whereas the core has a lower concentration.

The resulting heterogeneity causes changes in the material and in its properties during its life-cycle. It is consequently not possible to renovate the material, which reduces the service life thereof.

DISCLOSURE OF THE INVENTION

The aim of the invention is therefore to remedy these drawbacks and to propose a method for manufacturing a part made from carbon/carbon composite material wherein the distribution of the ceramic fillers is homogeneous in the material obtained and the optimised mechanical properties in the face of wear and rubbing thus making it possible to prolong the life of the material and in particular to renovate it.

A method is therefore proposed for manufacturing a part made from carbon/carbon composite material comprising:

the formation of a fibrous preform, partial densification of the fibrous preform by a carbonaceous matrix forming a partially densified blank, the impregnation of the partially densified blank with an impregnation solution including ceramic precursors or ceramic particles, and the drying of the impregnated blank.

Furthermore, the manufacturing method comprises control of the viscosity of the impregnation solution in order to control the homogeneity of the distribution during the drying of the ceramic particles or of the ceramic precursors in the blank.

Preferably, the viscosity of the impregnation solution is controlled so as to maintain a dynamic viscosity value of between 12 and 700 mPa s.

According to one embodiment, the impregnation solution can comprise a solution of the sol-gel type including ceramic precursors, preferably a derivative of zirconium, titanium, yttrium, hafnium or tantalum, or a mixture of these derivatives.

According to another embodiment, the impregnation solution can comprise a colloidal dispersion of ceramic precursors, preferably zirconium dioxide, titanium dioxide, yttrium (III) oxide, hafnium dioxide, tantalum pentoxide or a mixture of a plurality of these.

Preferably, the impregnation solution comprises a mass fraction of zirconium, titanium, yttrium, hafnium or tantalum or a mixture of a plurality of these of between 3 and 15%.

Preferably, the impregnation solution includes macromolecules of ceramic precursors or ceramic particles with a mean size less than or equal to 1 $\mu$m.

According to one example embodiment, the manufacturing method may comprise control of the partial gelling of the sol-gel solution.

According to another example embodiment, at least one thickening additive can be added to the impregnation solution, preferably a polymer in the poloxamer family, preferably again tri-block polymers of general formula poly(ethylene oxide)$_x$-poly(propylene oxide)$_n$-(polyethylene oxide)$_m$, m and n being fixed by the synthesis method of the manufacturer.

In a variant, the manufacturing method may also comprise the formulation of an impregnation solution of predetermined viscosity.

BRIEF DESCRIPTION OF THE DRAWINGS

Other aims, advantages and features will emerge from the following description, given purely by way of illustration and made with reference to the accompanying drawings, on which.

DETAILED DESCRIPTION OF AN EMBODIMENT

Hereinafter, the bounds of a range of values are included within this range, in particular in the expression "included between".

Figure 1:
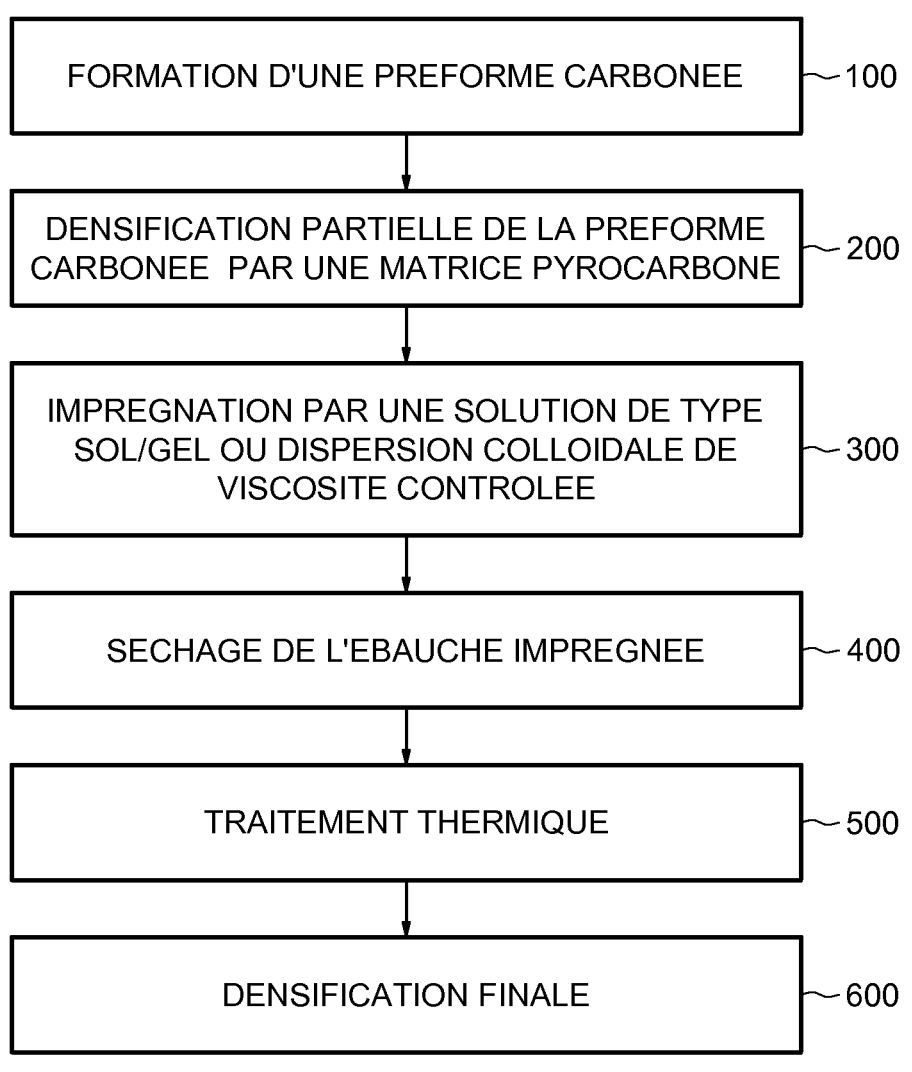
FIG. 1 illustrates a method for manufacturing a carbon/carbon composite material according to an embodiment in accordance with the invention.

FIG. 1 illustrates a method for manufacturing a part made from carbon/carbon composite material according to an embodiment of the invention.

In a first step 100, a carbon preform is formed. In the example illustrated, the preform is fibrous. The form of the part to be produced, for example a brake disc, can advantageously be given to the preform.

In a second step 200, the carbonaceous preform is partially densified by a pyrocarbon matrix in order, only in part, to fill in the porosity of the preform, forming a partially densified carbonaceous blank. The desiccation is, for example, implemented by chemical vapour infiltration (CVI).

Advantageously, the degree of porosity of the partially densified carbonaceous blank can be between 47 and 72% by volume.

An impregnation of the composite material obtained by an impregnation solution comprising ceramic particles or ceramic precursors is next implemented in a following step 300. According to an example embodiment, the impregnation solution can be a solution of the sol-gel type including ceramic precursors.

The ceramic precursors can be selected from: a derivative of a ceramic compound such as zirconium, titanium, yttrium, hafnium or tantalum, or a mixture of several of these derivatives.

According to an alternative embodiment, the impregnation solution can be a colloidal dispersion.

The colloidal dispersion can advantageously comprise zirconium dioxide, titanium dioxide, yttrium(III) oxide, hafnium dioxide, tantalum pentoxide or a mixture of a plurality of these.

Preferably, the impregnation solution of the sol-gel or colloidal dispersion type comprises a mass fraction of zirconium, titanium, yttrium, hafnium or tantalum or a mixture of a plurality of these of between 3 and 15%.

In addition, the impregnation solution will preferably include macromolecules of ceramic precursors or ceramic particles with a mean size less than or equal to 1 μm.

As is the case in the example illustrated, the impregnation can be implemented under vacuum, advantageously at a pressure of between 0.1 and 0.5 mbar, at ambient temperature for a period of 30 minutes to 1 hr.

According to the invention, the viscosity of the impregnation solution is controlled. In other words, the partially densified carbonaceous blank is impregnated with an impregnation solution of predetermined viscosity, selected so that it allows a homogeneous distribution in the material of the ceramic particles contained in the impregnation solution.

Preferably, the value of the dynamic viscosity of the impregnation solution is between 12 and 700 mPa s, considered at ambient temperature, around 23° C.

Preferably, the value of the viscosity of the impregnation solution is controlled over time, for example at various instants, so as to be maintained in this range of values, i.e.

between 12 and 700 mPa s, in order to guarantee during drying a homogeneous distribution of the ceramic particles contained in the impregnation solution.

The lower bound of the above range of dynamic viscosity values is fixed by obtaining a heterogeneous material with a lower-viscosity solution. In addition, the upper bound is fixed by the impossibility of impregnating the material with a higher-viscosity solution.

The viscosity of the impregnation solution can be controlled by directly adjusting the formulation of an impregnation solution so that it has a predetermined viscosity.

According to another example, at least one thickening additive can be added to the impregnation solution. Preferably a polymer in the poloxamer family, preferably again tri-block polymers of general formula poly(ethylene oxide) x-poly (propylene oxide)$_n$-poly(ethylene oxide)$_m$, m and n are fixed by the synthesis method of the manufacturer. For example, Pluronic® L44 or Tergitol® L64 can be used.

As an alternative, in the case of an impregnation solution of the sol-gel type, the manufacturing method may comprise control of the partial gelling of the sol-gel solution.

The manufacturing method next comprises a step 400 of drying the impregnated material.

In the example illustrated, the drying is preferably implemented at atmospheric pressure, at a temperature of between 60 and 100° C., for 48 hr to 72 hr and, advantageously, under inert atmosphere, for example under nitrogen.

The material can next be subjected to heat treatment, according to a following step 500, to allow conversion of the ceramic precursor or precursors into oxide or oxides.

The heat treatment can also be implemented to achieve the pyrolysis of any additives such as a thickener or a surfactant.

In the example illustrated, the heat treatment is advantageously implemented at a temperature of between 600 and 1700° C., preferably under a flow of nitrogen and under vacuum, at a pressure below atmospheric pressure.

Furthermore, the manufacturing method may comprise a following step 600 of densification of the carbon/carbon composite material thus filled with ceramic particles, advantageously by chemical gas infiltration, by the pyrocarbon matrix, in order to fill in the residual porosity.

Preferably, the final density of the carbon/carbon composite material is greater than 1700 g/cm$^3$.

Advantageously, the final mass fraction of derivative of zirconium, titanium, yttrium, hafnium or tantalum of the carbon/carbon composite material obtained can be between 1 and 10%.

The composition of the particles is preferentially, in a dominant manner, $ZrO_xC_y$, $TiO_xC_y$, $HfO_xC_y$, with x between 0 and 2 and y between 0 and 1, or $Y_wO_xC_y$ with w between 1 and 2, x between 0 and 3 and y between 0 and 1, or $Ta_wO_xC_y$ with w between 1 and 2, x between 0 and 5 and y between 0 and 1.

Examples A, B and C: Impregnation Solutions of the Sol-Gel Type

Three pieces made from carbon/carbon composite material were manufactured according to the manufacturing method illustrated above. Three impregnation-solution formulations were tested.

The matrix is made from pyrocarbon and the degree of open porosity of the blank partially densified by the matrix is between 62% and 72% by volume.

The composition of three examples of impregnation solution and the viscosity values of these measured compositions are presented in Table 1 below.

TABLE 1

| | Example A | Example B | Example C |
|---|---|---|---|
| Composition | Zirconium sol-gel | Zirconium sol-gel + 25% by mass Pluronic ® L44 | Partially gelled zirconium sol-gel |
| Dynamic viscosity (mPa s) | 4 | 19.2 | 667 |

The composition of the sol-gel impregnation solution of each example A, B and C comprises zirconium butoxide diluted in a butanol/ethanol mixture in the presence of water, hydrochloric acid and acetyl acetone.

In the examples illustrated, the viscosity of the impregnation solution is measured by means of a rotary viscometer. The sample of carbon/carbon composite material obtained according to each formulation is thermostatically controlled by means of a double-jacket assembly wherein the temperature of the heat-transfer fluid is regulated at 23° C. Three measurements were made on each sample. The speed of the rotor is fixed at 30 revolutions/min. The final viscosity value indicated in table 1 corresponds to the mean of the three measurements.

Example A corresponds to an impregnation solution without the precaution of controlling the viscosity.

Example B a corresponds to an impregnation solution incorporating a thickening additive, Pluronic® L44, aimed at increasing the viscosity of the solution.

Finally, example C corresponds to an impregnation solution the sol-gel of which is partially gelled.

The sol-gel mixture changes over time because of the polymerisation of the zirconium butoxide. This change results in an increase in the viscosity over time as far as total gelling of the mixture.

Partial gelling means gelling of the sol-gel to the desired viscosity. This control of the gelling can be obtained either by controlling the given duration of change at ambient temperature and atmospheric pressure, or by accelerating the process by heating the sol-gel under inert atmosphere. In the example illustrated, the change in the viscosity of the sol-gel was followed until the desired target value was obtained.

The distribution of the ceramic fillers of carbon/carbon composite materials obtained by impregnation of partially densified blanks by the compositions of examples A, B and C is controlled after heat treatment by measuring the filler gradient from the core to the edges of the material.

Figure 2:
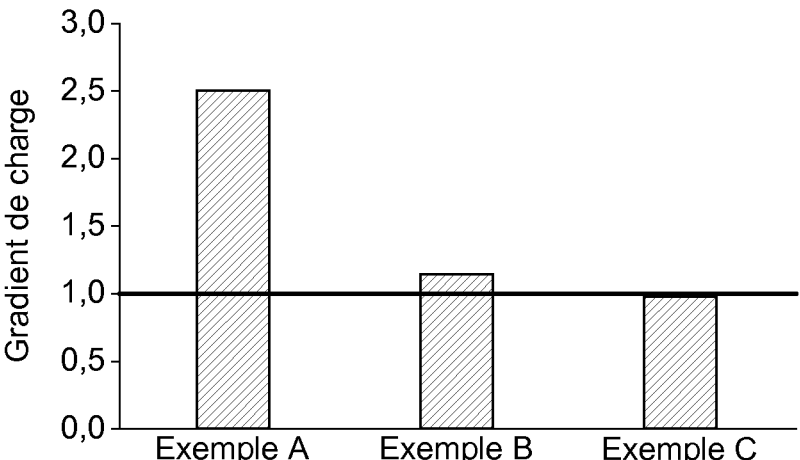
FIG. 2 is a graph showing the filler gradient of a carbon/carbon composite material obtained according to three examples of compositions of an impregnation solution of the sol-gel type.

The filler gradient was measured for each example and the results are presented on the graph in FIG. 2.

A value of 1 is associated with a homogeneous material. A value of less than 1 represents an excess of ceramic fillers at the core of the carbon/carbon composite material, and a value greater than 1 represents an excess of ceramic fillers at the edge of the material, in this example on the faces of the brake disc.

The measurement of the filler gradient can be measured by measuring the proportion of ash at the core and on the faces of the sample. This technique consists in evaluating the mass of ash remaining after calcination of the material.

Calibrated test pieces of the material to be evaluated are oxidised in air at 1000° C. for 15 hr in order to eliminate the carbon and to keep only the ceramic compound. The gradient is next calculated by taking the ratio of the proportions of ash on each face to that of the core.

In the examples illustrated, the filler gradient was measured by measuring the amount of ash.

According to one alternative, the filler gradient can be measured by inductive coupling plasma spectrometry (ICP), and calculating the ratio of the amount of fillers on each face of the material to that of the core.

Figure 3:
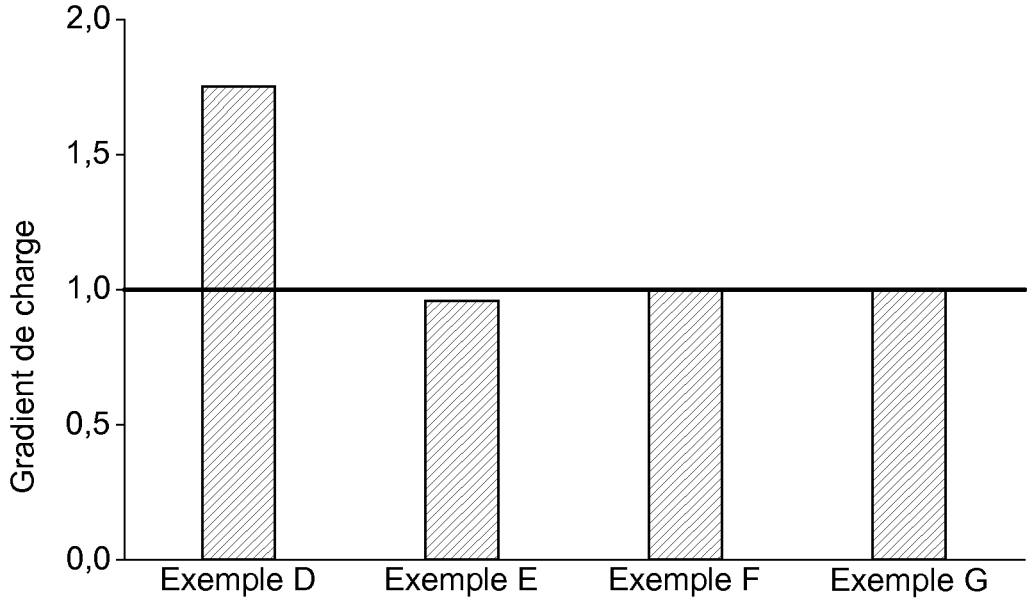
FIG. 3 is a graph showing the filler gradient of a carbon/carbon composite material obtained according to four examples of compositions of an impregnation solution of the colloidal dispersion type.

As can be seen on FIG. 3, example A, the viscosity of which is not controlled, has a filler gradient of approximately 2.5, i.e. much greater than 1. The material having high heterogeneity of distribution of the ceramic fillers, the ceramic fillers being mainly present at the edges of the material.

On the other hand, the materials obtained from the impregnation by an impregnation solution according to the compositions of examples B and C the viscosity of which is controlled have a filler gradient respectively of 1.1 and 1, representing homogeneous distribution.

When the viscosity of the impregnation solution is sufficient, i.e. in the predetermined range of values, advantageously between 12 and 700 mPa s, the material obtained has a homogeneous filler distribution.

Examples D, E, F and G: Impregnation Solutions of the Colloidal Dispersion Type Four impregnation solution compositions were prepared, corresponding to examples D, E, F and G, the formulations being presented in table 2 below.

The experimental protocol is similar to examples A, B and C, however the sol-gel solution is replaced by a colloidal dispersion.

TABLE 2

| | Example D | Example E | Example F | Example G |
|---|---|---|---|---|
| Composition | Colloidal dispersion 20% by mass $ZrO_2$ low viscosity | Colloidal dispersion 20% by mass $ZrO_2$ + 10% by mass Tergitol ® L64 | Colloidal dispersion 20% by mass $ZrO_2$ averagely viscous | Colloidal dispersion 15% by mass $ZrO_2$ averagely viscous |
| Dynamic viscosity (mPa s) | 5.4 | 16.14 | 29.74 | 14.14 |

Example D corresponds to an impregnation solution without the precaution of controlling the viscosity, with a low viscosity, i.e., in the example illustrated, with a viscosity of less than 12 mPa s.

Example E a corresponds to an impregnation solution comprising a thickening additive, Tergitol® L64, aimed at increasing the viscosity of the solution.

Finally, examples F and G correspond to impregnation solutions directly formulated to have a predetermined viscosity, averagely viscous, respectively 29.74 mPa s and 14.14 mPa s.

The filler gradient was measured for each example and the results are presented on the graph in FIG. 3.

As can be seen on FIG. 3, the composition of example D with a viscosity less than the predetermined range of values leads to a filler gradient much greater than 1, i.e. a heterogeneous distribution of ceramic particles in the material.

On the other hand, the compositions of examples E, F and G lead to a particularly homogeneous distribution.

As has also been demonstrated in the sol-gel impregnation solution examples, when the viscosity of the impregnation solution is controlled, i.e. in the predetermined range of values, advantageously between 12 and 700 mPa s, the material obtained has a homogeneous filler distribution.

The result is a carbon/carbon composite material with homogeneous properties throughout its life. This material can therefore be renovated, this process making it possible to extend its service life.

The invention claimed is:

1. A method for manufacturing a part made from carbon/carbon composite material, comprising:

formation of a fibrous carbonaceous preform;

partial densification of the preform by a pyrocarbon matrix in order to obtain a partially densified blank;

impregnation of the partially densified blank with an impregnation solution including ceramic particles or ceramic precursors; and, drying of the impregnated blank, wherein a viscosity of the impregnation solution is controlled in order to control a homogeneity of a distribution of the ceramic particles in at least a part of the impregnated blank during drying, the viscosity of the impregnation solution being controlled so as to maintain a dynamic viscosity value of between 12 and 700 mPa s.

2. The manufacturing method according to claim 1, wherein the impregnation solution comprises a sol-gel type solution including ceramic precursors.

3. The manufacturing method according to claim 2, further comprising controlling of a partial gelling of the sol-gel type solution by gelling the sol-gel to a required viscosity, the partial gelling being obtained either by controlling a given duration of change at ambient temperature and atmospheric pressure, or by accelerating the partial gelling by heating the sol-gel under inert atmosphere.

4. The manufacturing method according to claim 1, wherein the impregnation solution comprises a colloidal dispersion of ceramic particles.

5. The manufacturing method according to claim 1, wherein the impregnation solution comprises a mass fraction of zirconium, titanium, yttrium, hafnium or tantalum, or a mixture of several of these, between 3 and 15%.

6. The manufacturing method according to claim 1, wherein the impregnation solution includes macromolecules of ceramic precursors or ceramic particles with a mean size less than or equal to 1 $\mu$m.

7. The manufacturing method according to claim 1, wherein at least one thickening additive is added to the impregnation solution.

8. The manufacturing method according to claim 1, further comprising a formulation of an impregnation solution of predetermined viscosity.

9. The manufacturing method according to claim 2, wherein the impregnation solution is a derivative of zirconium, titanium, yttrium, hafnium or tantalum, or a mixture of several of these derivatives.

10. The manufacturing method according to claim 4, wherein the impregnation solution comprises zirconium dioxide, titanium dioxide, yttrium (III) oxide, hafnium dioxide, tantalum dioxide, or a mixture of two or more of these.

11. The manufacturing method according to claim 7, wherein the at least one thickening additive is a polymer in a poloxamer family.

* * * * *